United States Patent [19]
Vincent

[11] Patent Number: 5,266,104
[45] Date of Patent: Nov. 30, 1993

[54] THREAD PROTECTION SYSTEM

[76] Inventor: Larry W. Vincent, 965 Lakeview, Montgomery, Tex. 77353

[21] Appl. No.: 964,108

[22] Filed: Oct. 20, 1992

Related U.S. Application Data

[63] Continuation of Ser. No. 697,206, May 8, 1991, abandoned.

[51] Int. Cl.$^5$ .............................................. C04B 9/02
[52] U.S. Cl. ............................ 106/14.13; 106/14.15; 106/14.28; 106/14.31; 106/14.41; 106/14.42; 106/14.44; 252/389.62; 252/396
[58] Field of Search ............... 106/14.05, 14.11, 14.13, 106/14.24, 14.27, 14.28, 14.31, 14.41, 14.44; 252/388, 389.62, 396

[56] References Cited

U.S. PATENT DOCUMENTS

| | | | |
|---|---|---|---|
| 2,550,997 | 5/1951 | Harden et al. | 148/6.14 |
| 2,643,177 | 6/1953 | Wachter et al. | 21/2.5 |
| 3,779,818 | 12/1973 | Shoemaker | 148/6.14 R |
| 3,876,553 | 4/1975 | Kader | 252/389 |
| 3,901,836 | 8/1975 | Kader | 260/17 R |
| 4,469,469 | 9/1984 | Kennedy, Jr. | 405/157 |

OTHER PUBLICATIONS

Kirk-Othmer; Encyclopedia of Chemical Technology, vol. 3, Antibiotics (Phenazines) to Bleaching Agents; 3 pg. no date.

K. R. Tretheway & J. Chamberlain; Corrosion For Students of Science and Engineering; 5 pg. no date.

Primary Examiner—Mark L. Bell
Assistant Examiner—Margaret Einsmann
Attorney, Agent, or Firm—Ned L. Conley

[57] ABSTRACT

A corrosion inhibiting composition for protection of the threads of oil country tubular goods, including a vapor phase corrosion inhibitor and a liquid phase corrosion inhibitor in water solution. The corrosion inhibitor may be left on the threads for use in combination with an anaerobic sealing compound. A transparent thread protector may be used to protect the threads coated with the corrosion inhibitor.

6 Claims, 1 Drawing Sheet

THREAD PROTECTION SYSTEM

This is a continuation of copending application Ser. No. 07/697,206 filed on May 8, 1991 now abandoned.

FIELD OF THE INVENTION

This invention relates to a method and system for protecting pipe threads from corrosion, and in particular is directed to such a method and system for protection of oil field tubular goods, including tubing, drill pipe, casing and other apparatus having threaded connections. The invention includes a new corrosion inhibiting composition and a novel thread protector.

BACKGROUND OF THE INVENTION

A major industry has developed in the protection of the threads of oil field tubular goods to prevent them from corroding during the period between manufacture and use, because of the high cost of such tubular goods and because of the importance of being sure that there are no defects in the threads which could cause them to leak after the pipe has been installed in a well. Oil well tubing often must withstand a pressure of hundreds or even thousands of pounds per square inch. A leak after the tubing is installed means the tubing must be pulled and repaired or replaced, at a cost of perhaps hundreds of thousands of dollars.

Pipe thread corrosion may be ordinary oxidation, or rust, or it may be caused or supplemented by microorganisms which feed on various materials on the surface of the thread and produce an acid which causes pitting of the threads. A variety of means have been used to prevent such corrosion, with questionable success. Commonly, API (American Petroleum Institute) Bulletin 5A2 pipe dope has been used, although it is low in corrosion inhibiting properties. This pipe dope is designed to be a thread compound, with lubricating and sealing properties. It is a thick grease-based material which contains lead and other filler materials to seal the helical passageway in the round profile threads commonly used on oil field tubular goods. Another material which has come into use is a wax-based material sold under the trademark KENDEX. Other, lighter materials, such as a light oil, are sometimes used if the pipe is to be used within a day or two of the time it is threaded. Such corrosion inhibitors are applied to the threads as soon as the pipe is threaded, in an effort to prevent flash rust which can occur in a very short time.

After the corrosion inhibitor has been applied, the thread is further protected by screwing on a cover known as a thread protector. Thread protectors may be made of metal or plastic, or combinations of metal and plastic, and are constructed to protect the threads against impact damage. Many thread protectors, aptly called "dust covers" in the field, are loose fitting and are of no value in keeping moisture away from the threads. Some, however, include an end cover to close the end of the pipe, and some are also snug fitting and include moisture seals in an effort to improve corrosion protection.

In the manufacture of threaded tubular goods, the threading machines use a water-based cutting fluid. After threading, the cutting fluid is either wiped off or blown off with air, the "corrosion inhibitor" is immediately applied, and thread protectors are put on. The pipe is then put in a pipe storage yard, usually exposed to the elements, until it is needed.

However, the oil, grease or wax-based materials which have previously been used to inhibit corrosion have some major drawbacks. The manufacturing operation, and even the methods used to clean the cutting fluids from the threads, necessarily leave some water on the threads, as well as some organic and sulfur compounds, and often microbes which can feed on the organic and sulfur-containing materials and excrete acids. The grease and wax-based materials previously used do not absorb or remove the water, but instead enclose it on the surface of the threads, leaving oxygen and microbes in contact with the threads to do their damage.

Because of this, if the pipe, with corrosion inhibitor and thread protectors in place, stays in a storage yard for more than about 60-90 days, it is desirable to inspect the threads to be sure that corrosion has not begun. This is done by removing the thread protectors, cleaning off the corrosion inhibiting material with a solvent, steam or some mechanical means, inspecting the threads, reapplying corrosion inhibitor, and either applying new thread protectors or cleaning and reapplying the ones previously used. As long as the pipe is in the yard, this process should be repeated every 60-90 days to ensure against thread corrosion.

This inspection process is expensive in the cost of the corrosion inhibitor and thread protectors, but more importantly in the cost of manpower for cleaning and retreating the threads. Moreover, every time the lead-containing API dope is cleaned off, there is a contamination problem which must be dealt with. It has been estimated that as much as two million pounds of lead are deposited on the ground each year through this process alone. Kendex and other inhibitors previously used are cleaned off with solvents, such as naphtha, diesel fuel or other petroleum-based materials which flow onto the ground and cause a contamination problem.

When the pipe is finally sent to a rig for installing in a well, it is necessary to again remove the thread protectors, clean the threads, inspect for corrosion, apply a thread sealant, and then make up the joints for installation in the well. Such materials as the API pipe dope and Kendex are not compatible with the newer anaerobic sealants used as thread joint compounds, such as those disclosed in U.S. Pat. No. 4,813,714, one embodiment of which is manufactured by Loctite Corporation of Newington, Connecticut, and sold under the trademark SEALLUBE. It is necessary to remove the grease or wax based material and thoroughly clean the threads before this type of sealant is used.

Others have recognized the problem with the materials commonly used as corrosion inhibitors on oil field tubular goods, and have proposed solutions. Levesque, in an article entitled "Rust-inhibition fluids protect OCTGs in storage", published in WORLD OIL, March, 1985, discussed the use of tin or zinc plating or phosphate coatings for this application. He also pointed out the desirability of non-metallic snug fitting thread protectors with moisture seals to reduce corrosion.

Vapor phase corrosion inhibitors are well-known for the protection of steel from corrosion during shipping and storage. These inhibitors produce a vapor which precipitates a film which is adsorbed on exposed surfaces. Two common vapor phase inhibitors are dicyclohexylamine nitrite and cyclohexylamine carbonate. However, both of these inhibitors have some degree of toxicity, and various non-toxic proprietary compositions have therefore been produced and are in use to provide corrosion protection. One of those compositions is sold under the trademark Cortrol VCI, and is manufactured by Corless International, Ltd. The vapor phase inhibitors are intended to be used dry, but many of them will continue to provide some corrosion control when dissolved in water.

Generally, however, when the surface to be protected is immersed in water, as in steel tanks or boiler tubes, liquid phase inhibitors, such as the water soluble inorganic and organic salts which create a passive surface on the metal, are used. One such known liquid phase corrosion inhibitor is sodium benzoate.

SUMMARY OF THE INVENTION

It is an object of this invention to provide a method and system for protection of pipe threads from corrosion which eliminates the problem of contamination from removing corrosion inhibiting materials.

It is another object of the invention to provide a corrosion inhibitor which is easily and quickly applied at minimum cost and which need not be removed prior to applying a thread compound upon assembly of the tubular materials.

Another object of the invention is to provide a corrosion inhibiting composition which is compatible with anaerobic sealants used as thread compounds.

Another object of the invention is to provide a thread protection system which is environmentally safe, can be used without cleaning the pipe thread before making up joints, and which is less costly than systems previously used.

It is a further object of the invention to provide a thread protecting method and system which includes a combination of a thread protector and a corrosion inhibitor which allows inspection of threads for corrosion without disassembling the thread protector from the pipe and without cleaning the corrosion inhibitor from the threads.

BRIEF DESCRIPTION OF THE DRAWING

FIG. of the drawing depicts a longitudinal sectional view of a tubing end and one embodiment of a thread protector of the invention.

DESCRIPTION OF THE PREFERRED EMBODIMENTS

Figure 1:
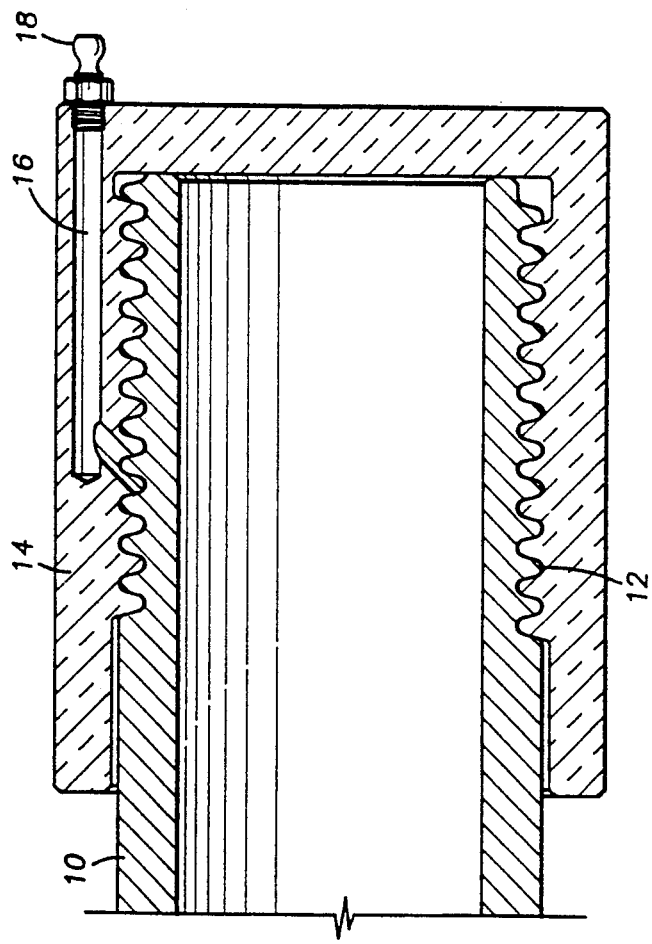

According to this invention, a combination of a vapor phase inhibitor and a liquid phase inhibitor is applied to the threads in a very light coating. Preferably, a transparent plastic thread protector is then screwed onto the threads. With this combination of elements, the threads may be periodically inspected without removing the thread protectors to determine whether any corrosion has begun. Any corrosion will be visible through the transparent thread protector and the inhibitor coating, so it is not necessary to remove the inhibitor from the pipe threads to inspect them. Thus, there is no contamination of the premises when this procedure is followed.

The corrosion prevention method and system of this invention preferably uses a unique inhibitor comprising a combination of a liquid phase inhibitor and a vapor phase inhibitor dissolved in water. The inhibitor solution contains no grease or oil, but in fact includes a surfactant to facilitate close contact of the water base inhibitor solution with the pipe thread to b protected.

This unique corrosion inhibitor is most advantageously used on pipe threads which are to be assembled with anaerobic thread compounds, such as the product sold under the trademark SEALLUBE, because the inhibitor does not interfere with the effectiveness of the thread compound. The compound of this invention is environmentally safe, it can be used without cleaning, and it saves a tremendous amount of labor. Furthermore, it is more economical than other materials that are available.

The inhibitor of this invention is a solution of a liquid phase inhibitor such as sodium benzoate, a vapor phase inhibitor, such as Cortrol VCI, a surfactant and, in the preferred embodiment, alcohol, all dissolved in water.

Cortrol VCI is a dry powder formed of two different types of crystals, some of which are elongated and others of which are irregular in shape. It is water soluble. It consists primarily of sodium benzoate with a high proportion, approximately 15% to 25%, of alkylated sodium benzoate compounds and traces of water and tertiary amine salts. Such a material may be produced from coal tar distillates which include toluene, xylene and other alkyl benzenes. A product such as Cortrol VCI would result from partial oxidation of coal tar distillates to form acid groups on the benzene rings, followed by reaction with sodium benzoate compounds. Cortrol VCI differs significantly from commercial grades of sodium benzoate which are generally made from nearly pure toluene and contain at most only one or two percent of alkylated compounds.

Preferably the composition is prepared by initially preparing a saturated solution of the liquid phase inhibitor in water, adding the surfactant, then dissolving the vapor phase inhibitor in the solution until saturation is reached. Alcohol may be added to the solution at any convenient time. A suitable solution of the inhibitor of this invention ma be made by preparing a saturated solution of sodium benzoate in water, requiring approximately 150 pounds of sodium benzoate in 36 gallons of water, adding a small amount, from about 1/10 pound to about ¾ pound, of a liquid surfactant and then dissolving sufficient vapor phase inhibitor to create a saturated solution, about 55 pounds. Finally, about 25 pounds of an alcohol such as isopropyl alcohol are added.

A saturated, or nearly saturated, solution is preferred for general use, because of the reduced volume of material required, and because it is more economical to store and to transport. However, the inhibitor of this invention is effective in very small amounts, so that in some applications it may be desirable to use a much lower concentration of the liquid phase and the vapor phase inhibitors, for example as low as 2% to 10% by weight of each material. A slightly supersaturated solution may also be prepared, but this may result in some of the material precipitating out of solution in cold weather. In any case, it is desirable to have sufficient alcohol in the solution to minimize possible precipitation of solids, and to prevent freezing at ambient temperatures. If the material is to be used at temperatures above about five degrees Celsius, the alcohol may be omitted. Thus from zero to about 10% by weight of alcohol may be used. The amount of surfactant is not critical, the purpose being to improve the ability of the solution to form a film on the threads, and to provide sufficient surfactant to cut any oil or grease film on the threads so the inhibitor can achieve a good contact with the threads.

In use, the inhibitor of this invention is usually sprayed or brushed on the threads 12 of the tubing 10 as shown in FIG. 1 of the drawing. Because it is water based, the inhibitor combines with any water that is present on the threads. Grease-based compounds previously used hold the oxygen-containing water against the threads and cause pitting and rusting damage. The inhibitor of this invention works wet or dry. The vapor phase inhibitor produces a monomolecular film at the surface of the metal which migrates to all recessed areas and cavities and binds to the outer valence molecule of the iron compound so that the iron acts as though it were inert to the oxygen molecule.

After the inhibitor is applied to the clean threads, a thread protector 14 is screwed on. Preferably the thread protector should be made of an impact resistant transparent material such as high density polyethylene, polypropylene and the like. The thread protectors can be made from recycled materials such as milk cartons and soft drink bottles. A preferred thread protector has a small amount, e.g. 5% to 10%, of vapor phase inhibitor incorporated in the polymeric material to add to the effectiveness of the inhibitor which has been applied to the threads.

Such transparent thread protectors are also useful with other inhibitors which do not conceal the threads, such as light oils, and various commercial rust inhibitors such as that sold under the trademark WD-40.

Advantageously, the thread protector may be provided with a port 16 fitted with a grease fitting 18 through which additional inhibitor may be applied from time to time during storage if inspection reveals loss or deterioration of the originally applied inhibitor. Since the thread protector is transparent, one may readily determine whether the inhibitor has penetrated to all the threaded area of the tubing.

Although the drawing shows a male pipe thread, female pipe threads may be similarly treated with the inhibitor of this invention and provided with a transparent thread protector.

Alternatively, a suitable thread protector may be made of foamed-in-place polyurethane or other foamed material which contains a vapor phase inhibitor in the foam. This type of protector may be used with or without the inhibitor of this invention.

When a "dust cover" protector, i.e. one which does not fully seal in the threads or cover the end of the pipe, is used, the water in the inhibitor solution will usually evaporate, leaving a thin, white film deposited on the threads, the film containing both the vapor phase inhibitor and the liquid phase inhibitor. When a premium protector, i.e. one which completely encloses the threads and the end of the pipe, is used, the water base may not evaporate completely; nevertheless, the threads are protected by the synergistic effect of the two inhibitors.

The inhibitor of this invention is effective even if the thread protector leaks a little and allows some moisture to contact the threads, as for example when it rains. The moisture will merely re-dissolve the inhibitor which is on the threads, so that the liquid phase inhibitor continues to provide protection.

The inhibitor of this invention has a high pH, so it serves to neutralize any acid which may be on the threads or which may result from microbial action. In addition, the inhibitor contains no sustenance for microbes, so it is antimicrobial.

To be sure that the inhibitor is working, periodically the threads should be inspected to make sure that they are not corroding. With the transparent thread protector, a visual inspection is possible without removing the thread protector The inhibitor of this invention, when it dries, leaves a thin white film, and any corrosion which may occur under this film will be apparent because the film is only a few molecules thick. Thus it is possible to inspect the threads for corrosion without removing the transparent pipe thread protectors.

Figure 3:
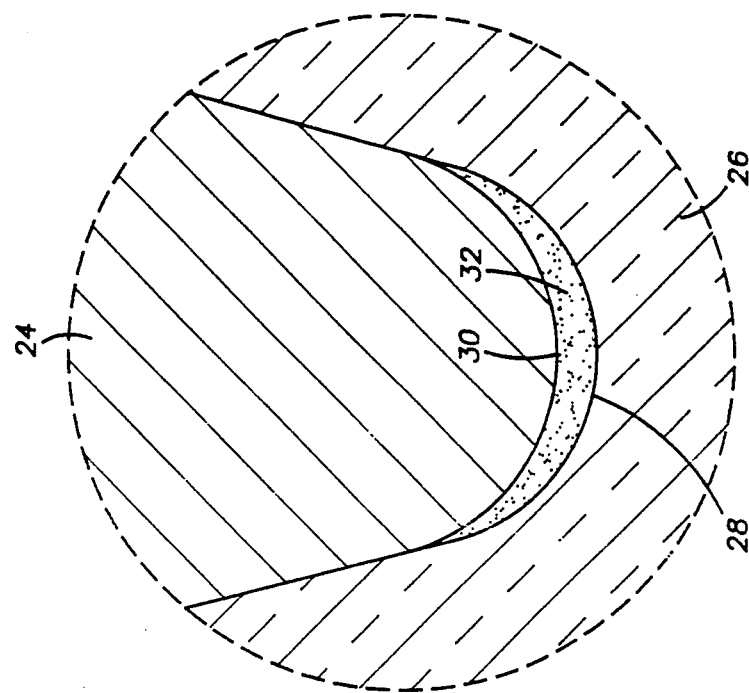
FIG. 3 shows an enlarged section of the threaded connection of FIG. 2.
Figure 2:
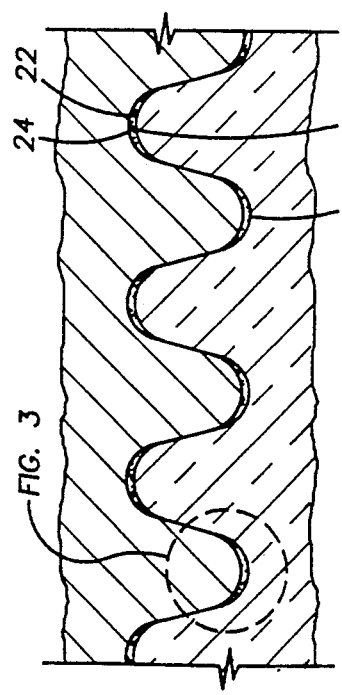
FIG. 2 depicts a fragment of a threaded connection between male and female threads using one embodiment of the invention.

When the pipe is ready for use, the thread protector is removed and a suitable thread compound is applied. Since it is compatible with thread compounds, it is not necessary to clean the inhibitor from the threads before applying the thread compound. As shown in FIG. 2, when a connection is made up, there is a small space 22 between the mating threads 24, 26. The width of the space 22 is exaggerated in the drawing to more clearly show the materials in the space. As seen in FIG. 3, the inhibitor appears as a thin film 28, 30 on the surfaces of the threads, with the sealant 32 filling the space 22.

Several embodiments of the invention are disclosed, however the invention is not limited to these specific embodiments, but includes all variations included within the scope of the claims.

I claim:

1. A corrosion inhibiting composition comprising:
   a vapor phase corrosion inhibitor comprising sodium benzoate, approximately 15 percent to 25 percent of alkylated sodium benzoate compounds, and traces of water and tertiary amine salts; and
   a liquid phase corrosion inhibitor comprising sodium benzoate.

2. The corrosion inhibiting composition of claim 1, wherein said vapor phase corrosion inhibitor consists essentially of sodium benzoate, approximately 15 percent to 25 percent of alkylated sodium benzoate compounds, and traces of water and tertiary amine salts.

3. The corrosion inhibiting composition of claim 1, wherein the composition comprises a substantially saturated aqueous solution of both said vapor phase inhibitor and said liquid phase inhibitor.

4. A corrosion inhibiting composition comprising:
   a vapor phase corrosion inhibitor, said vapor phase corrosion inhibitor being produced by the oxidation of coal tar distillates having benzene rings, including toluene, xylene and other alkyl benzenes to form acid groups on the benzene rings, followed by reaction with sodium hydroxide to produce sodium benzoate and alkylated sodium benzoate compounds; and
   a liquid phase corrosion inhibitor comprising sodium benzoate.

5. The corrosion inhibiting composition of claim 4, wherein said vapor phase corrosion inhibitor consists essentially of sodium benzoate, approximately 15 percent to 25 percent of alkylated sodium benzoate compounds, and traces of water and tertiary amine salts.

6. The corrosion inhibiting composition of claim 5, wherein the composition comprises a substantially saturated aqueous solution of both said vapor phase inhibitor and said liquid phase inhibitor.

* * * * *